(12) United States Patent  (10) Patent No.: US 8,143,845 B2
Choi  (45) Date of Patent: Mar. 27, 2012

(54) CABLE VOLTAGE DROP COMPENSATION FOR BATTERY CHARGERS

(75) Inventor: Hangseok Choi, Bedford, NH (US)

(73) Assignee: Fairchild Semiconductor Corporation, South Portland, ME (US)

( * ) Notice: Subject to any disclaimer, the term of this patent is extended or adjusted under 35 U.S.C. 154(b) by 577 days.

(21) Appl. No.: 12/337,324

(22) Filed: Dec. 17, 2008

(65) Prior Publication Data
US 2010/0148730 A1    Jun. 17, 2010

(51) Int. Cl.
*H02J 7/00* (2006.01)
(52) U.S. Cl. ............................ 320/108; 320/141
(58) Field of Classification Search ........... 320/108, 320/140, 141; 323/266; 363/19
See application file for complete search history.

(56) References Cited

U.S. PATENT DOCUMENTS

| | | | |
|---|---|---|---|
| 5,942,885 A | 8/1999 | Nemoto et al. | |
| 5,949,658 A | 9/1999 | Thottuvelil et al. | |
| 6,163,136 A | 12/2000 | Celenza | |
| 6,246,592 B1 | 6/2001 | Balogh et al. | |
| 6,301,135 B1 | 10/2001 | Mammano et al. | |
| 6,356,466 B1 * | 3/2002 | Smidt et al. | 363/21.17 |
| 6,396,716 B1 | 5/2002 | Liu et al. | |
| 6,479,968 B1 | 11/2002 | Pozsgay et al. | |
| 6,483,726 B2 | 11/2002 | Chen et al. | |
| 6,597,159 B2 | 7/2003 | Yang | |
| 6,721,192 B1 | 4/2004 | Yang et al. | |
| 6,836,415 B1 | 12/2004 | Yang et al. | |
| 6,853,563 B1 | 2/2005 | Yang et al. | |
| 6,862,194 B2 | 3/2005 | Yang et al. | |
| 6,972,969 B1 | 12/2005 | Shteynberg et al. | |
| 7,005,914 B2 | 2/2006 | Balakrishnan et al. | |
| 7,016,204 B2 | 3/2006 | Yang et al. | |
| 7,054,170 B2 | 5/2006 | Yang et al. | |
| 7,064,497 B1 | 6/2006 | Hsieh | |
| 7,106,603 B1 | 9/2006 | Lin et al. | |
| 7,190,215 B2 | 3/2007 | Balakrishnan et al. | |
| 2007/0222411 A1 * | 9/2007 | Cour | 320/101 |
| 2008/0084715 A1 * | 4/2008 | Hsu et al. | 363/21.04 |
| 2008/0088292 A1 * | 4/2008 | Stoichita et al. | 323/285 |
| 2008/0291701 A1 * | 11/2008 | Lin | 363/21.1 |

OTHER PUBLICATIONS

Fairchild Semiconductor FAN102 Primary-Side-Control PWM Controller, Dec. 2008 Data Sheet, pp. 1-14.

* cited by examiner

*Primary Examiner* — Arun Williams
(74) *Attorney, Agent, or Firm* — Okamoto & Benedicto LLP (57) ABSTRACT

A battery charger may be configured to charge a battery by way of a charging cable. A DC gain of a voltage control loop of the battery charger may be limited to a predetermined value to compensate for voltage drop on the charging cable. For example, a DC gain of an error amplifier on the voltage control loop may be limited to a predetermined value for cable voltage drop compensation. The error amplifier may use a reference signal that is generated as a function of the error signal. The DC gain of the error amplifier may be limited by connecting a resistor to form an RC circuit on an output node of the error amplifier.

20 Claims, 5 Drawing Sheets

CABLE VOLTAGE DROP COMPENSATION FOR BATTERY CHARGERS

BACKGROUND OF THE INVENTION

1. Field of the Invention

The present invention relates generally to electrical circuits, and more particularly but not exclusively to battery chargers.

2. Description of the Background Art

Battery chargers may be used to charge batteries of portable electrical devices including cell phones, power tools, digital cameras, MP3 players, and personal digital assistants, to name a few examples. A battery charger may be implemented using a commercially-available PWM (pulse width modulation) controller integrated circuit (IC), such as the FAN102 primary-side-regulated (PSR) PWM controller from Fairchild Semiconductor. When employed in a battery charger, a PWM controller IC is configured to compensate for voltage drop on a charging cable connecting the battery charger to the battery. In a conventional PWM controller, such as the FAN 102 controller, the cable voltage drop necessitates the use of a dedicated cable compensation circuit and an extra, dedicated IC pin to attach additional electrical components for cable compensation to meet particular application specifications, such as output current, output voltage, and cable resistance.

SUMMARY

A battery charger may be configured to charge a battery by way of a charging cable. A DC gain of a voltage control loop of the battery charger may be limited to a predetermined value to compensate for voltage drop on the charging cable. For example, a DC gain of an error amplifier on the voltage control loop may be limited to a predetermined value for cable voltage drop compensation. The error amplifier may use a reference signal that is generated as a function of the error signal. The DC gain of the error amplifier may be limited by connecting a resistor to form an RC circuit on an output node of the error amplifier.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
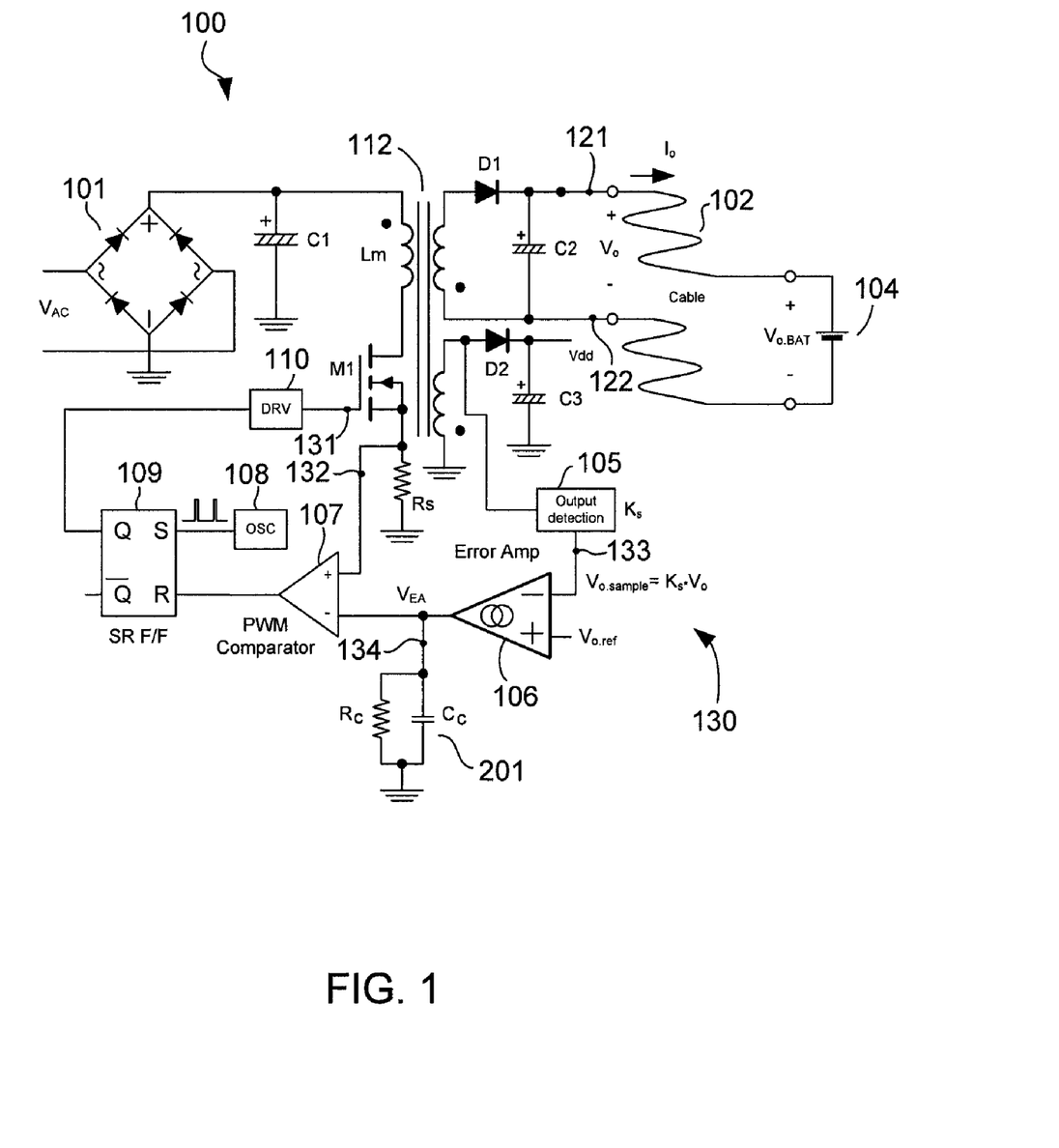
FIG. 1 schematically shows a battery charger in accordance with an embodiment of the present invention.

FIG. 1 schematically shows a battery charger 100 in accordance with an embodiment of the present invention. In the example of FIG. 1, an input AC line voltage VAC is rectified by a full-wave rectifier 101. The rectified voltage is coupled to the primary windings of a transformer 112 through an input capacitor C1. The voltage developed on the secondary windings of the transformer 112 is coupled to the output capacitor C2 by way of a diode D1. The voltage across the output capacitor C2 is presented as the output voltage $V_O$ generated by the charger 100. The nodes 121 and 122 represent connectors to which a charging cable 102 is connected to charge a rechargeable battery 104. The battery voltage $V_{O,BAT}$ is the resulting voltage developed across the battery 104 by the output voltage $V_O$.

The operation of the battery charger 100 is controlled by a PWM (pulse width modulation) controller 130, which is implemented as an IC (integrated circuit) chip. In the example of FIG. 1, the PWM controller 130 comprises an error amplifier 106, a PWM comparator 107, an oscillator 108, an SR (set-reset) flip-flop 109, and a driver circuit 110. The use of an IC chip is advantageous for a variety of reasons including small form factor and low manufacturing cost.

In the example of FIG. 1, the PWM controller 130 is in an IC packaging with pins 131-134. The pins 131-134 are schematically shown as nodes in the battery charger 100. Pin 131 provides a control signal to drive the gate of a transistor M1, pin 132 is used to sense the drain-to-source current flowing through the transistor M1 when ON, pin 133 is used to sense the output voltage Vo by way of an output detection circuit 105, and pin 134 allows for attachment of additional components (resistor Rc and capacitor Cc in this example) for compensation on the voltage control loop. The PWM controller 130 may also have a pin for receiving a power supply, a pin for ground, and another pin for attaching additional components for compensation on the current loop, for a total of seven pins. For reasons that will be more apparent below, the PWM controller 130 does not require a separate pin to couple electrical components to the PWM controller 130 for configuring cable voltage drop compensation. This advantageously provides savings in manufacturing cost, complexity, and size. Components for configuring cable voltage drop compensation are typically external to the PWM controller IC to allow the IC to be adapted to different charging cables for different applications. Such a pin for cable voltage drop compensation is not necessary with the PWM controller 130, so the PWM controller 130 may be embodied in an IC with less than 8 pins, which is a typical pin count of conventional PWM controllers.

In the example of FIG. 1, the battery charger 100 is a primary-side-regulated (PSR) battery charger in that the coupling of the primary winding of the transformer 112 to ground (or other circuit) is controlled to generate the output voltage $V_O$. More specifically, the PWM controller 130 drives the transistor M1 ON and OFF depending on the error voltage $V_{EA}$, which reflects the difference between a reference voltage $V_{O.REF}$ and the output voltage $V_O$. Generally speaking, the PWM controller 130 is configured to control the duty cycle of the conduction of the transistor M1 such that the duty cycle is decreased when the error voltage $V_{EA}$ increases and is increased when the error voltage $V_{EA}$ decreases. The PWM controller 130 controls the duty cycle of the transistor M1 conduction time so that the error between a target voltage (i.e., the desired value of the output voltage) and the output voltage $V_O$ can be minimized. In one embodiment, the PWM controller 130 uses peak current-mode PWM to control the duty cycle of the transistor M1 conduction time so that the output voltage can follow the target voltage.

An output detection circuit 105 with a gain of $K_S$ samples the output voltage to generate a sampled output voltage $V_{O.SAMPLE}$ indicative of the of the output voltage $V_O$. As shown in FIG. 1, the output detection circuit 105 may sample the output voltage $V_O$ at a secondary winding other than that connected to the battery 104. In the example of FIG. 1, the output detection circuit 105 samples the output voltage $V_O$ at an anode of an output diode D2 that accepts a power supply $V_{DD}$. The power supply $V_{DD}$ may be connected to a node connecting the cathode of the output diode D2 to an output capacitor C3. As will be more apparent below, an RC circuit 201 comprising a resistor Rc and a capacitor Cc limits the DC gain of the error amplifier 106 for charging cable voltage drop compensation.

Figure 2:
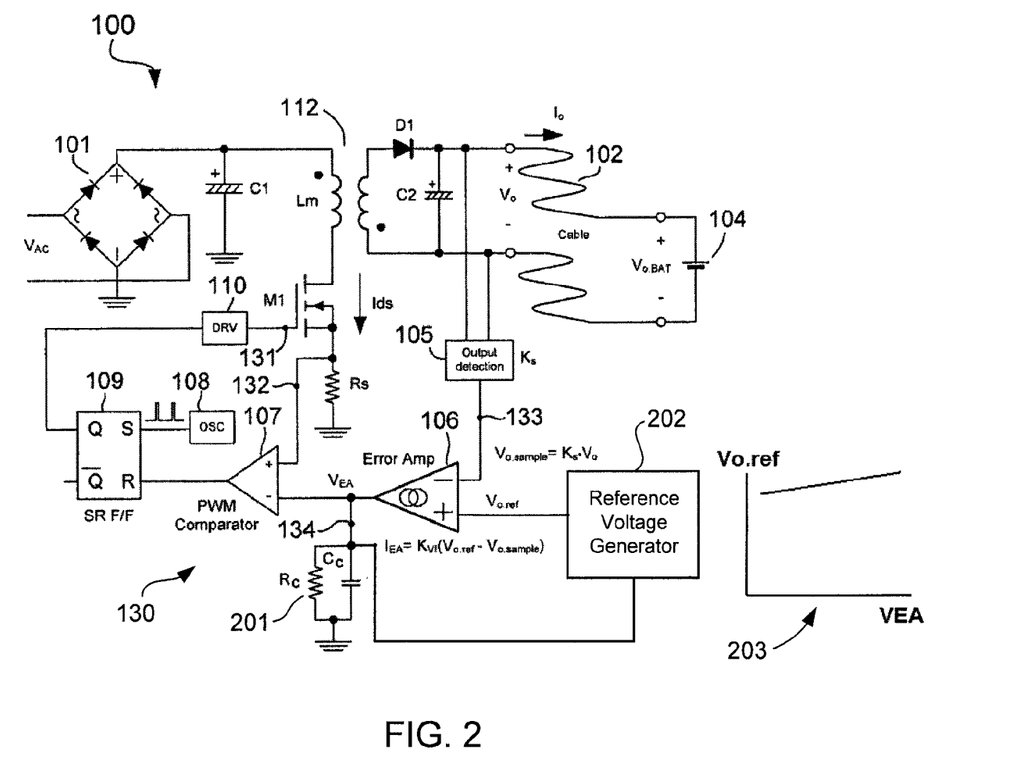
FIG. 2 schematically shows a reference voltage generator in the PWM controller of the battery charger of FIG. 1 in accordance with an embodiment of the present invention.

FIG. 2 schematically shows the use of a reference voltage generator 202 internal to the PWM controller 130 in accordance with an embodiment of the present invention. In the example of FIG. 2, the PWM controller 130 performs peak-current mode control PWM to control the duty cycle of the transistor M1 conduction time so that the output voltage can follow the target voltage. Once the transistor M1 is turned ON, a drain-to-source current $I_{DS}$ linearly increases and flows through the primary winding of the transformer 112 and the transistor M1. The current $I_{DS}$ is converted into a sense voltage on the pin 132 using the sense resistor Rs. The error amplifier 106 generates the error voltage $V_{EA}$ on its output node at the pin 134 by subtracting the sampled output voltage $V_{O.SAMPLE}$ on the pin 133 from the reference voltage $V_{O.REF}$. The transistor M1 is turned OFF by the PWM comparator 107 when the sense voltage reaches the error voltage $V_{EA}$. Thus, the transistor M1 has more conduction time as the error voltage $V_{EA}$ increases.

The reference voltage generator 202 may be configured to generate the reference voltage $V_{O.REF}$ as a function of the error voltage $V_{EA}$. For example, the reference voltage $V_{O.REF}$ may be generated to be directly proportional to the error voltage $V_{EA}$. In one embodiment, the reference voltage generator 202 is configured to increase the reference voltage $V_{O.REF}$ when the error voltage $V_{EA}$ increases and to decrease the reference voltage $V_{O.REF}$ when the error voltage $V_{EA}$ decreases. In the example of FIG. 2, the reference voltage generator 202 is configured to increase or decrease with the error voltage $V_{EA}$ (see plot 203) substantially in a linear fashion. It is to be noted, however, that this is not necessarily the case as the reference voltage generator 202 may also use a non-linear function to generate the reference voltage $V_{O.REF}$ as a function of the error voltage $V_{EA}$.

In the example of FIG. 2, the output detection circuit 105 is schematically shown as being across the output capacitor C2 for ease of illustration. As shown in FIG. 1, the output detection circuit 105 may sample the output voltage $V_O$ at another node on the secondary side of the transformer 112 without detracting from the merits of the present invention.

As shown in FIG. 2, the output detection circuit 105 samples the output voltage $V_O$ to generate a sampled output voltage $V_{O.SAMPLE}$. The sampled output voltage $V_{O.SAMPLE}$ may be described as $$V_{O.SAMPLE} = K_S V_O \qquad \text{EQ. 1}$$

where $K_S$ is the gain of the output detection circuit 105.

In the example of FIG. 2, the error amplifier 106 comprises a transconductance amplifier with a transconductance gain of $K_{VT}$. The error amplifier 106 compares the sampled output voltage $V_{O.SAMPLE}$ to the reference voltage $V_{O.REF}$ to generate an error amplifier output current $I_{EA}$ indicative of the level of the output voltage $V_O$. The error amplifier output current $I_{EA}$ may be described as $$I_{EA} = K_{VT}(V_{O.REF} - V_{O.SAMPLE}) \qquad \text{EQ. 2}$$

The error amplifier 106 generates the error amplifier output current $I_{EA}$ at its output node to feed the RC circuit 201 comprising the resistor Rc and capacitor Cc. The RC circuit 201 introduces finite DC gain to the output of the error amplifier 106 to generate an error voltage $V_{EA}$, which is also indicative of the level of the output voltage.

The inductance of the primary winding of the transformer 112 is represented by the inductor Lm. When the transistor M1 is switched ON, the electrical current flowing through the inductor Lm, i.e., primary winding of the transformer 112, is the drain-to-source current Ids through the transistor M1. The current Ids develops a sense voltage across the resistor Rs. As can be appreciated, the sense voltage across the resistor Rs is indicative of the inductor current, which flows through the inductor Lm. The PWM comparator 107 compares the error voltage $V_{EA}$ to the sense voltage developed across the resistor Rs to reset the SR flip-flop 109, and thus switch OFF the transistor M1, in accordance with peak-current mode control PWM. Generally speaking, the PWM comparator 107 initiates turning OFF of the transistor M1 when the sense voltage on the resistor Rs rises to the same level as the error voltage $V_{EA}$.

Figure 3:
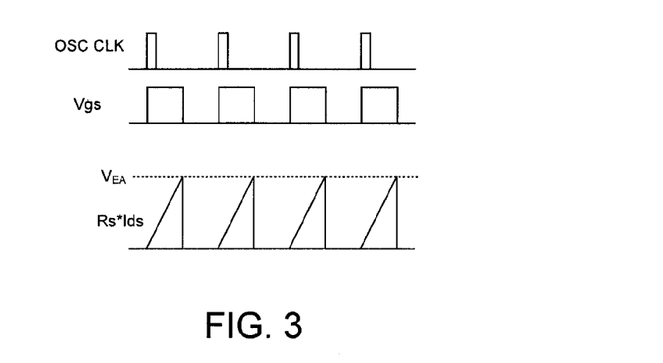
FIG. 3 shows a timing diagram for signals in the battery charger of FIG. 2 in accordance with an embodiment of the present invention.

The driver circuit 110 is configured to switch ON the transistor M1 when the output Q of the SR flip-flop 109 is at a logical HIGH and to switch OFF the transistor M1 when the Q output of the SR flip-flop 109 is at a logical LOW. The oscillator 108 provides a clock signal that periodically sets the SR flip-flop 109 to switch ON the transistor M1. The PWM comparator 107 resets the SR flip-flop 109, and thus switches OFF the transistor M1, when the inductor current increases such that the sense voltage across the sense resistor Rs rises to the same level as the error voltage $V_{EA}$. The timing relationship between the oscillator clock output of the oscillator 108 ("OSC CLK"), the gate-to-source voltage $V_{GS}$ of the transistor M1 as a result of driving by the driver circuit 110, the sense voltage on the sense resistor Rs ("Rs*Ids"), and the error voltage $V_{EA}$ is summarized in FIG. 3.

Referring back to FIG. 2, the output voltage $V_O$ is presented by the cable 102 as the battery voltage $V_{O.BAT}$ across the battery 104. Because of the voltage drop on the cable 102, the output voltage $V_O$ will be typically higher than the battery voltage $V_{O.BAT}$ during normal operation. Unless some form of cable voltage drop compensation is employed, the battery voltage $V_{O.BAT}$ will vary as the output current $I_O$ generated by the battery charger 100 changes.

In a conventional PWM controller, such as the FAN102 PWM controller by Fairchild Semiconductor, cable voltage drop compensation is performed using a dedicated cable compensation circuit to generate the reference voltage for the error amplifier on the voltage control loop. That scheme not only requires a dedicated cable compensation circuit but also needs a separate IC pin to configure the cable compensation circuit. In marked contrast, the PWM controller 130 does not require a dedicated cable compensation circuit and requisite cable compensation pin. For example, in the battery charger 100, the way the reference voltage $V_{O.REF}$ is generated may be predetermined in the factory and remain the same in the field, regardless of the charging cable employed. Cable compensation is thus performed by fixing the cable compensation gain and using the DC (direct current) loop gain of the output voltage control loop to adjust cable compensation to meet particular application requirements, such as output current, output voltage, and cable resistance. In the example of FIG. 2, the RC circuit 201 acts as low pass filter and shows constant gain characteristics below the critical frequency of the RC circuit 201 formed by resistor Rc and capacitor Cc (see EQ. 12).

In the example of FIG. 2, the DC loop gain of the output voltage control loop may be set by the DC gain of the error amplifier 106. By fixing the DC loop gain of the output voltage control loop according to the system specification such as output voltage, output current and cable resistance, a steady state error is introduced in the output voltage $V_O$. The steady state error depends on the DC loop gain and may be used as an adjustable cable voltage drop compensation. This feature of the invention is further explained with reference to FIGS. 4 and 5.

Figure 4:
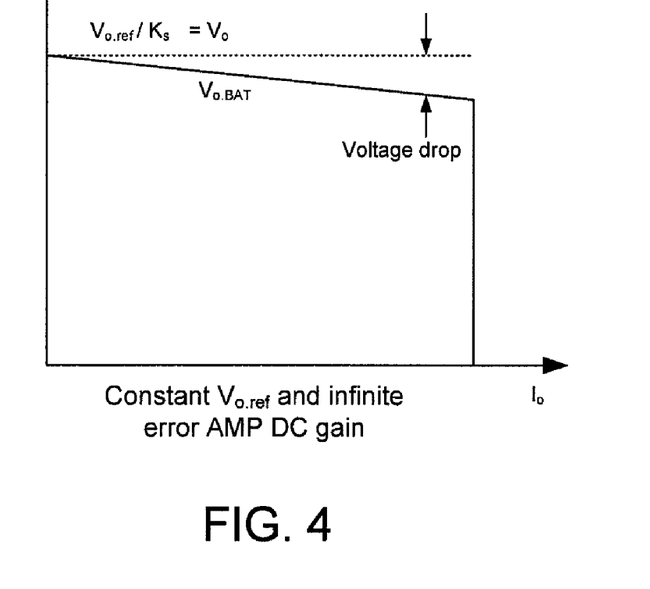
FIG. 4 shows plots of battery voltage and output voltage as a function of output current in the case where the reference voltage is constant and the gain of the error amplifier is theoretically infinite.

FIG. 4 shows plots of the battery voltage $V_{O.BAT}$ and the output voltage $V_O$ as a function of output current $I_O$ (i.e., current delivered to the battery 104; see FIG. 2) in the case where the reference voltage $V_{O.REF}$ is constant and the gain of the error amplifier 106 is theoretically infinite (i.e., not limited; without the integrator formed by the resistor Rc and Cc). Notice how the voltage drop on the cable 102 increases as the output current increases, resulting in a non-regulated battery voltage $V_{O.BAT}$.

Figure 5:
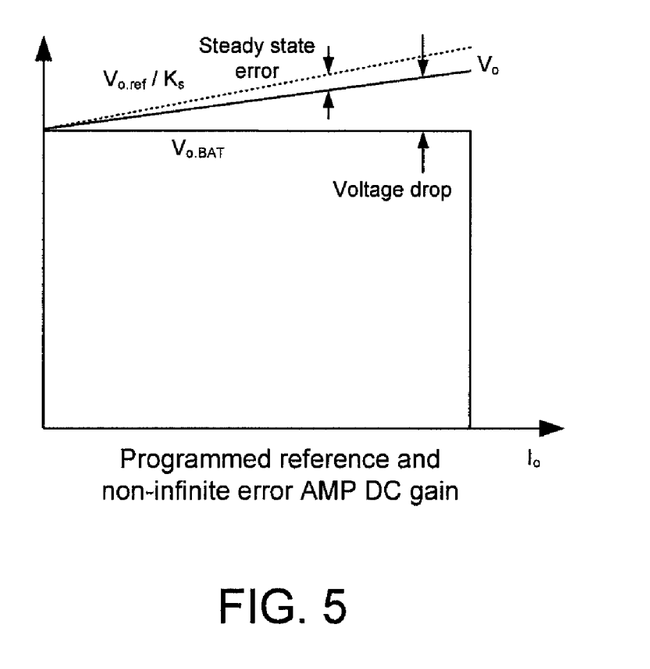
FIG. 5 shows plots of battery voltage and output voltage as a function of output current of a battery charger in accordance with an embodiment of the present invention.

FIG. 5 shows plots of the battery voltage $V_{O.BAT}$ and the output voltage $V_O$ as a function of the output current $I_O$ in the case of the battery charger 100. In the battery charger 100, the reference voltage $V_{O.REF}$ is configured such that the reference voltage $V_{O.REF}$ increases as the error voltage $V_{EA}$ increases. The error voltage $V_{EA}$ increases as the load current increases, which occurs when the load resistor (which includes the resistance of the cable 102) decreases.

Unlike in conventional battery chargers, the gain of the error amplifier 106 in FIG. 2 is not theoretically infinite, but instead limited by the RC circuit 201 formed by the resistor Rc and capacitor Cc. The value of the resistor Rc may be adjusted to change the DC gain of the error amplifier 106. This results in a steady state error that increases as the output current increases, compensating for the voltage drop on the cable 102. This is illustrated in FIG. 5 where the resulting voltage drop on the cable 102 varies with changing output current $I_O$, delivering a regulated (i.e., relatively constant or within a limited voltage range) battery voltage $V_{O.BAT}$ across the battery 104.

Referring back to FIG. 2, the output power $P_O$ of the battery charger 100, the input power $P_{IN}$ of the battery charger 100, and the DC gain $K_{EA.DC}$ of the error amplifier 106 may be described as follows.

$$P_o = \frac{V_o^2}{R_L} \qquad \text{EQ. 3}$$

$$P_{in} = \frac{1}{2}L_m f_s (I_{ds}^{pk})^2 = \frac{1}{2}L_m f_s \left(\frac{V_{EA}}{R_S}\right)^2 \qquad \text{EQ. 4}$$

$$K_{EA.DC} = K_{VI} R_C \qquad \text{EQ. 5}$$

where $f_S$ is the switching frequency dictated by the oscillator 108, $I_{DS}^{PK}$ is the peak inductor current (i.e., peak of the current Ids through the inductor Lm), and $R_L$ is the effective load resistance (Vo/Io). Setting the output power $P_O$ equal to the input power $P_{IN}$ and solving for the steady state error voltage $V_{EA.DC}$, $$P_o = P_{in} \Rightarrow \frac{V_o^2}{R_L} = \frac{1}{2} L_m f_s \left(\frac{V_{EA}}{R_S}\right)^2 \qquad \text{EQ. 6}$$

$$V_o = \sqrt{\frac{1}{2} L_m f_s R_L} \left(\frac{V_{EA}}{R_S}\right) \qquad \text{EQ. 7}$$

$$V_{EA.DC} = \qquad \text{EQ. 8}$$
$$K_{VI} R_C (V_{o.ref} - V_{o.sample}) = K_{EA.DC}(V_{o.ref} - V_{o.sample})$$

The output voltage $V_O$ in steady state may be obtained as follows.

$$V_o = \sqrt{\frac{1}{2} L_m f_s R_L} \cdot \frac{K_{EA.DC}}{R_S}(V_{o.ref} - K_S V_o) \qquad \text{EQ. 9}$$

$$\therefore V_o = \frac{\sqrt{\frac{1}{2} L_m f_s R_L} \cdot \frac{K_{EA.DC} \cdot K_S}{R_S}}{1 + \sqrt{\frac{1}{2} L_m f_s R_L} \cdot \frac{K_{EA.DC} \cdot K_S}{R_S}} \cdot \frac{V_{o.ref}}{K_S} \qquad \text{EQ. 10}$$

$$V_o = \frac{M \cdot \sqrt{R_L} \cdot K_{EA.DC}}{1 + M \cdot \sqrt{R_L} \cdot K_{EA.DC}} \cdot \frac{V_{o.ref}}{K_S} \qquad \text{EQ. 11}$$

where, $K_S$ is the gain of the output detection circuit 105 (see FIG. 2).

EQ. 11 shows that if the DC gain $K_{EA.DC}$ of the voltage control loop is infinite, the output voltage $V_O$ will be same as its target value (i.e., $V_{o.ref}/Ks$). When the DC gain $K_{EA.DC}$ of the voltage control loop is not infinite, steady state error is generated and the output voltage $V_O$ will no longer be same as its target value. EQ. 11 further shows that the steady state error decreases as the load resistor $R_L$ increases (i.e. as the output current $I_O$ decreases) and the steady state error becomes zero when the load resistor $R_L$ is infinite (i.e. when the output current $I_O$ is zero). Therefore, the output voltage $V_O$ may be adjusted by adjusting the DC gain $K_{EA}$ of the error amplifier 106, which in turn may be adjusted by appropriate selection of the value of the resistor Rc (see EQ. 5). This advantageously allows the designer to select a value of the resistor Rc to generate an output voltage $V_O$ that results in a desired battery voltage $V_{O.BAT}$ for a given charging cable and other load characteristics, such as desired or application-specific output current and output voltage.

Figure 6:
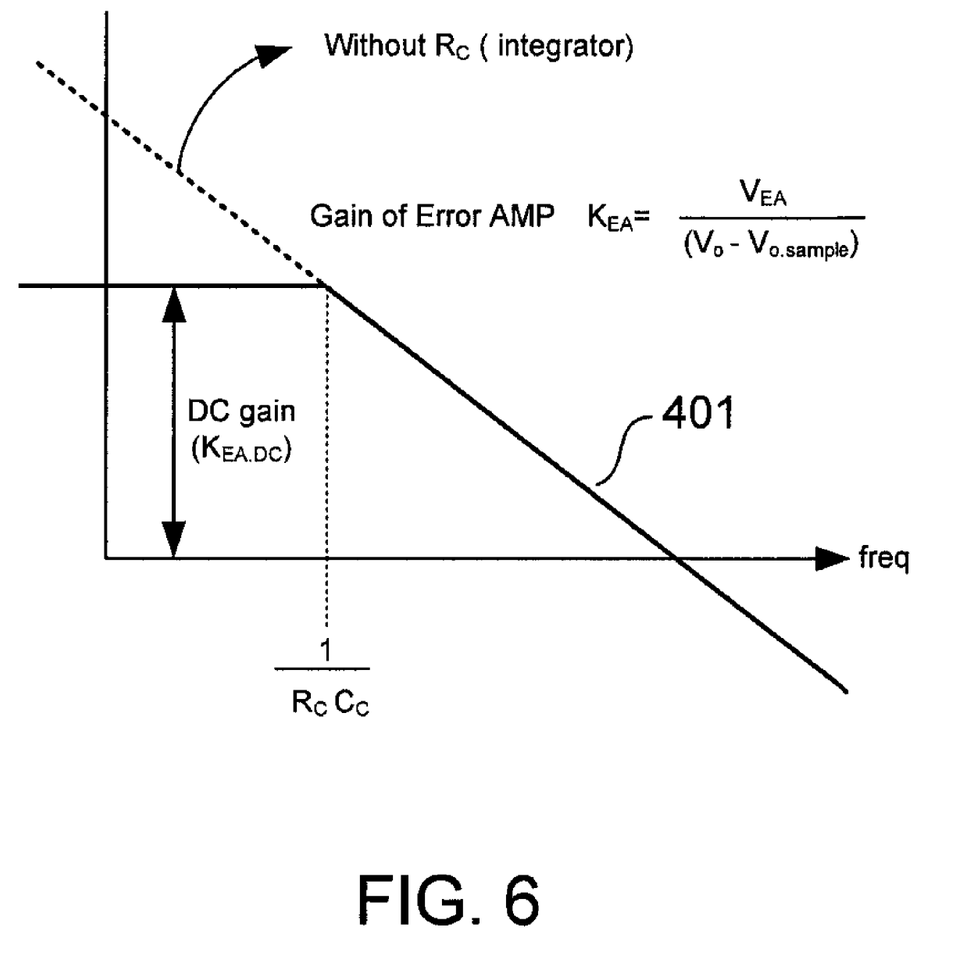
FIG. 6 shows a plot of gain of an error amplifier versus frequency in a voltage control loop of a battery charger in accordance with an embodiment of the present invention.

FIG. 6 shows a plot 401 of the gain of an error amplifier versus frequency in a voltage control loop of a PWM controller in accordance with an embodiment of the present invention. In the example of FIG. 6, the error amplifier is the error amplifier 106 of the battery charger 100 (see FIG. 2).

As shown in FIG. 6, the steady state or DC gain $K_{EA}$ of the error amplifier 106, and thus the voltage control loop, is limited to a predetermined value by the RC circuit formed by the resistor Rc and capacitor Cc. The DC gain $K_{EA}$ of the error amplifier 106 is for a range of switching frequencies below a critical frequency $F_C$ dictated by the values of the resistor Rc and capacitor Cc as follows, $$Fc = \frac{1}{R_C C_c} \qquad \text{EQ. 12}$$

Without the resistor Rc (i.e., without the RC circuit), the DC gain $K_{EA}$ of the error amplifier 106 would not be limited, which is noted in FIG. 6 as a dash line. With the RC circuit in place to limit the DC gain $K_{EA}$, the designer may adjust the resistor Rc to adjust the DC gain $K_{EA}$ to a predetermined value to compensate for different charging cable characteristics. This advantageously allows for cable voltage drop compensation without the need for a dedicated and complex cable compensation circuit. As can be appreciated, an RC circuit at the output of the error amplifier of the voltage control loop can be readily implemented without using a separate circuit block. Furthermore, an additional pin for cable voltage drop compensation is not required. The resistor Rc may be coupled to the pin of the output of the error amplifier; such a pin is typically provided anyways for frequency compensation on the voltage control loop.

Figure 7:
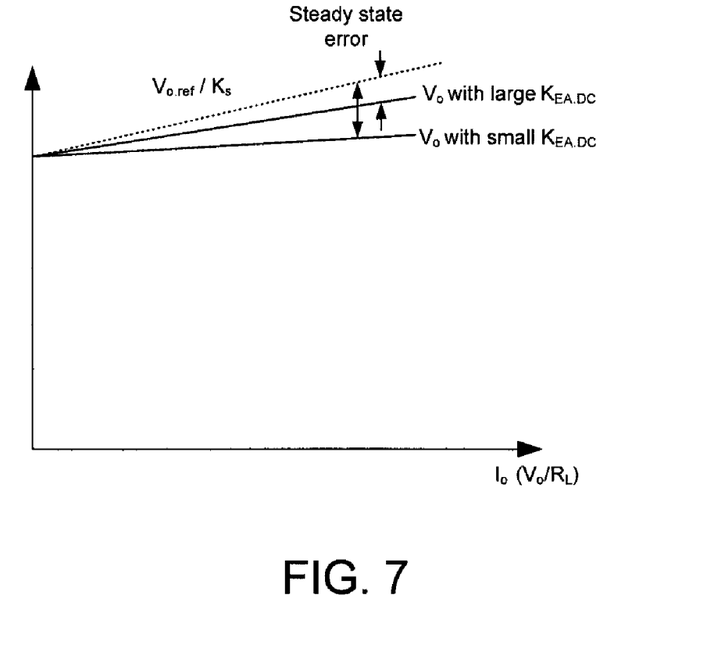
FIG. 7 show plots of output voltage versus output current of a battery charger in accordance with an embodiment of the present invention.

FIG. 7 show plots of the output voltage $V_O$ versus the output current $I_O$ in accordance with an embodiment of the present invention. As shown in FIG. 7, the output voltage $V_O$ may be adjusted by adjusting the DC gain $K_{EA}$ of the voltage control loop error amplifier. One way of adjusting the DC gain $K_{EA}$ is by adjusting the value of the resistor Rc on an RC circuit coupled to the output of the error amplifier. The DC gain $K_{EA}$ affects the steady state error, which affects the output voltage $V_O$.

Figure 8:
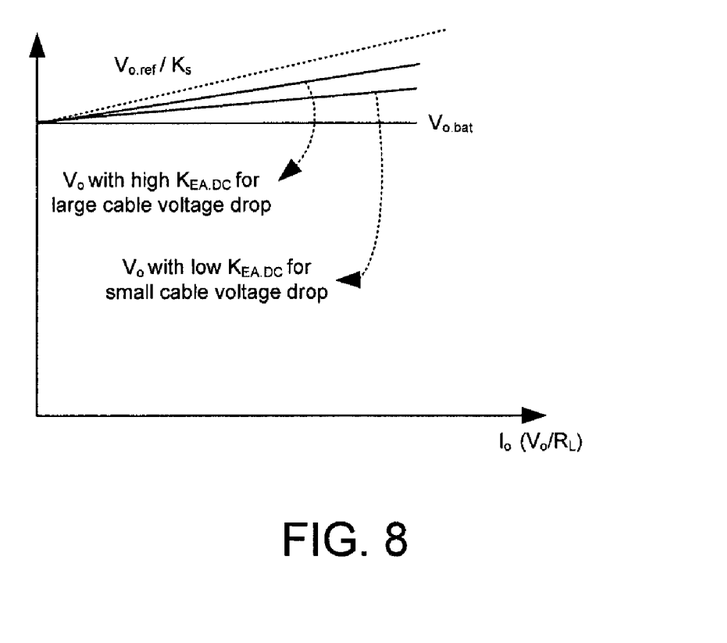
FIG. 8 shows plots of battery voltage versus output current of a battery charger in accordance with an embodiment of the present invention.

FIG. 8 shows plots of battery voltage $V_{O,BAT}$ versus output current in accordance with an embodiment of the present invention. As shown in FIG. 8, the DC gain $K_{EA}$ may be adjusted to achieve a regulated, target battery voltage $V_{O,BAT}$ across the rechargeable battery. Adjusting the DC gain $K_{EA}$ changes the output voltage $V_O$ to compensate for the voltage drop on the charging cable.

Circuits and methods for charging cable voltage drop compensation in battery chargers have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A battery charger comprising:
   a transformer having a primary winding and a secondary winding;
   a transistor coupled to the primary winding of the transformer, the transistor being configured to couple the primary winding to ground when the transistor is ON and to decouple the primary winding from ground when the transistor is OFF, the transistor being configured to receive an inductor current through the primary winding when the transistor is ON;
   a comparator having a first input node and a second input node, the first input node of the comparator being coupled to receive a sense signal indicative of the inductor current, the second input node of the comparator being coupled to receive an error signal, the comparator being configured to generate at an output node of the comparator a control signal for controlling switching of the transistor by comparing the sense signal to the error signal; and
   an error amplifier having a first input node and a second input node, the first input node of the error amplifier being coupled to receive a reference voltage that changes as a function of the error signal, the second input node of the error amplifier being coupled to receive a sampling of an output voltage generated by the battery charger to charge a battery by way of a charging cable, the error amplifier being configured to generate the error signal at an output node of the error amplifier by comparing the sampling of the output voltage to the reference voltage, the error signal being indicative of a level of the output voltage, the error amplifier being configured to compensate for voltage drop on the charging cable by having a predetermined and limited DC gain.

2. The battery charger of claim 1 wherein the error amplifier comprises a transconductance amplifier.

3. The battery charger of claim 1 further comprising an RC circuit coupled to an output node of the error amplifier to limit the DC gain of the error amplifier to a predetermined value.

4. The battery charger of claim 1 wherein the comparator comprises a PWM (pulse width modulation) comparator configured to turn OFF the transistor when the inductor current rises to a threshold level.

5. The battery charger of claim 4 wherein the error signal is an error voltage and the sense signal is a sense voltage developed on a sense resistor by the inductor current, and the PWM comparator turns OFF the transistor when the sense voltage rises to a same level as the error voltage.

6. The battery charger of claim 4 further comprising an SR flip-flop, and wherein the PWM comparator resets the SR flip-flop to turn OFF the transistor when the inductor current rises to a threshold level.

7. The battery charger of claim 1 further comprising a sense resistor coupled to receive the inductor current to develop the sense signal comprising a sense voltage when the transistor is ON.

8. The battery charger of claim 1 further comprising an oscillator configured to periodically set an SR flip-flop to turn ON the transistor.

9. The battery charger of claim 1 further comprising an output detection circuit configured to generate the sampling of the output voltage.

10. An electrical circuit for charging a battery, the circuit comprising:
   an error amplifier in a voltage control loop of a battery charger that is configured to charge a battery by way of a charging cable, the error amplifier having a first input node and a second input node, the error amplifier being configured to generate an error signal at an output node of the error amplifier by comparing a sampled output voltage indicative of an output voltage of the battery charger at the first input node of the error amplifier to a reference voltage at the second input node of the error amplifier, a DC gain of the voltage control loop being limited to a predetermined value to compensate for voltage drop on the charging cable and develop a regulated battery voltage to charge the battery;
   a reference voltage generator coupled to the second input node of the error amplifier, the reference voltage generator being configured to generate the reference voltage as a function of the error signal; and a comparator having a first input node and a second input node, the comparator being configured to generate at an output node of the comparator a control signal to control switching of a transistor and generation of the output voltage by comparing the error signal at the first input node of the comparator to a sense signal at the second input node of the comparator, the sense signal being indicative of inductor current flowing through a primary winding of a transformer of the battery charger.

11. The circuit of claim 10 wherein the error amplifier comprises a transconductance amplifier, the error signal is an error voltage developed across an RC circuit by an error current output of the error amplifier, and the sense signal comprises a sense voltage developed by the inductor current on a sense resistor.

12. The circuit of claim 10 further comprising:
a transistor coupled to receive the inductor current when the transistor is ON, and wherein the sense signal comprises a sense voltage developed by the inductor current on a sense resistor coupled to the transistor.

13. The circuit of claim 10 wherein the DC gain of the voltage control loop is limited by a DC gain of the error amplifier.

14. The circuit of claim 13 wherein the DC gain of the error amplifier has a predetermined value set by a resistor coupled to an output node of the error amplifier.

15. The circuit of claim 10 further comprising an output detection circuit configured to sample the output voltage to generate the sampled output voltage.

16. The circuit of claim 10 wherein the comparator comprises a PWM comparator.

17. A method of compensating for voltage drop on a charging cable coupling a battery charger to a rechargeable battery, the method to be performed by an electrical circuit and comprising:
sensing an output voltage of the battery charger to generate a sampled output voltage;
comparing the sampled output voltage to a voltage reference to generate an error voltage using an error amplifier, the error amplifier having a limited DC gain;
adjusting the voltage reference as a function of the error voltage, the error voltage being indicative of a level of the output voltage;
comparing the error voltage to a sense voltage indicative of inductor current on a primary winding of a transformer to control generation of the output voltage; and
charging the rechargeable battery with a battery voltage presented by the output voltage through the charging cable, the DC gain of the error amplifier being configured to generate the battery voltage to compensate for voltage drop on the charging cable.

18. The method of claim 17 wherein the error amplifier has a DC gain limited by an RC circuit coupling an output of the error amplifier to ground.

19. The method of claim 18 wherein the comparison of the error voltage to the sense voltage is performed by a PWM comparator.

20. The method of claim 17 wherein the error amplifier comprises a transconductance amplifier and the method further comprises:
outputting an error amplifier output current from the error amplifier to an RC circuit coupled to an output node of the error amplifier.

* * * * *